United States Patent [19]
Yoo

[11] Patent Number: 5,662,025
[45] Date of Patent: Sep. 2, 1997

[54] CONTROL CIRCUIT FOR AN ELECTRIC COOKER

[75] Inventor: Chang Hyun Yoo, Suwon, Rep. of Korea

[73] Assignee: Samsung Electronics Co., Ltd., Suwon, Rep. of Korea

[21] Appl. No.: 698,593

[22] Filed: Aug. 16, 1996

[30] Foreign Application Priority Data

Aug. 21, 1995 [KR] Rep. of Korea ............... 95-25711

[51] Int. Cl.⁶ .................. A47J 27/00; A47J 37/00; H05B 1/00; H05B 1/02
[52] U.S. Cl. ............... 99/332; 99/325; 99/337; 99/403; 99/468; 219/451; 219/494; 219/497; 219/627; 219/510
[58] Field of Search .............. 99/325–336, 358, 99/403, 337, 338, 339, 340, 468; 219/451–453, 626, 627, 665, 494, 510, 501, 667, 497, 508, 509, 521, 432

[56] References Cited

U.S. PATENT DOCUMENTS

| | | |
|---|---|---|
| 3,651,753 | 3/1972 | Schmidt ............... 99/337 X |
| 3,863,048 | 1/1975 | Buckley ............... 219/521 X |
| 3,908,111 | 9/1975 | DuBois et al. ......... 219/442 |
| 4,011,431 | 3/1977 | Levin ................. 99/340 |
| 4,046,991 | 9/1977 | Sefton et al. ......... 219/501 X |
| 4,136,324 | 1/1979 | Fischer et al. ........ 337/139 |
| 4,164,175 | 8/1979 | Burstein et al. ....... 99/446 |
| 4,554,440 | 11/1985 | Lee, Jr. .............. 219/501 |
| 4,565,122 | 1/1986 | Feuillalay ............ 99/447 |
| 4,757,176 | 7/1988 | Suzuki et al. ......... 219/627 |
| 4,885,447 | 12/1989 | Gonzalez .............. 219/626 |
| 4,983,812 | 1/1991 | Worrall et al. ........ 219/451 |
| 5,355,777 | 10/1994 | Chen et al. ........... 99/403 X |

*Primary Examiner*—Timothy F. Simone
*Attorney, Agent, or Firm*—Burns, Doane, Swecker & Mathis, L.L.P.

[57] ABSTRACT

Disclosed is a control circuit for an electric cooker. In the control circuit of the electric cooker, a voltage selection supply rectifies a selected voltage, and applies it to a voltage sensor. The voltage sensor compares the voltage from a power supply controller with a reference voltage from a time proportion temperature controller, and applies the result to a temperature controller. The temperature controller has a time controlling resistor. The time proportion temperature controller generates a time proportion control signal having a constant period, and applies the time proportion control signal to the power supply controller. Simultaneously, a switching mode temperature controller having a thermal sensor generates a heater control signal according to a heater temperature sensed by the thermal sensor, and the heater control signal to the power supply controller. The power supply controller logically processes signals from the above temperature controllers, and generates a voltage applying signal to the heater, thereby controlling the heater to perform cooking or warming operations.

11 Claims, 4 Drawing Sheets

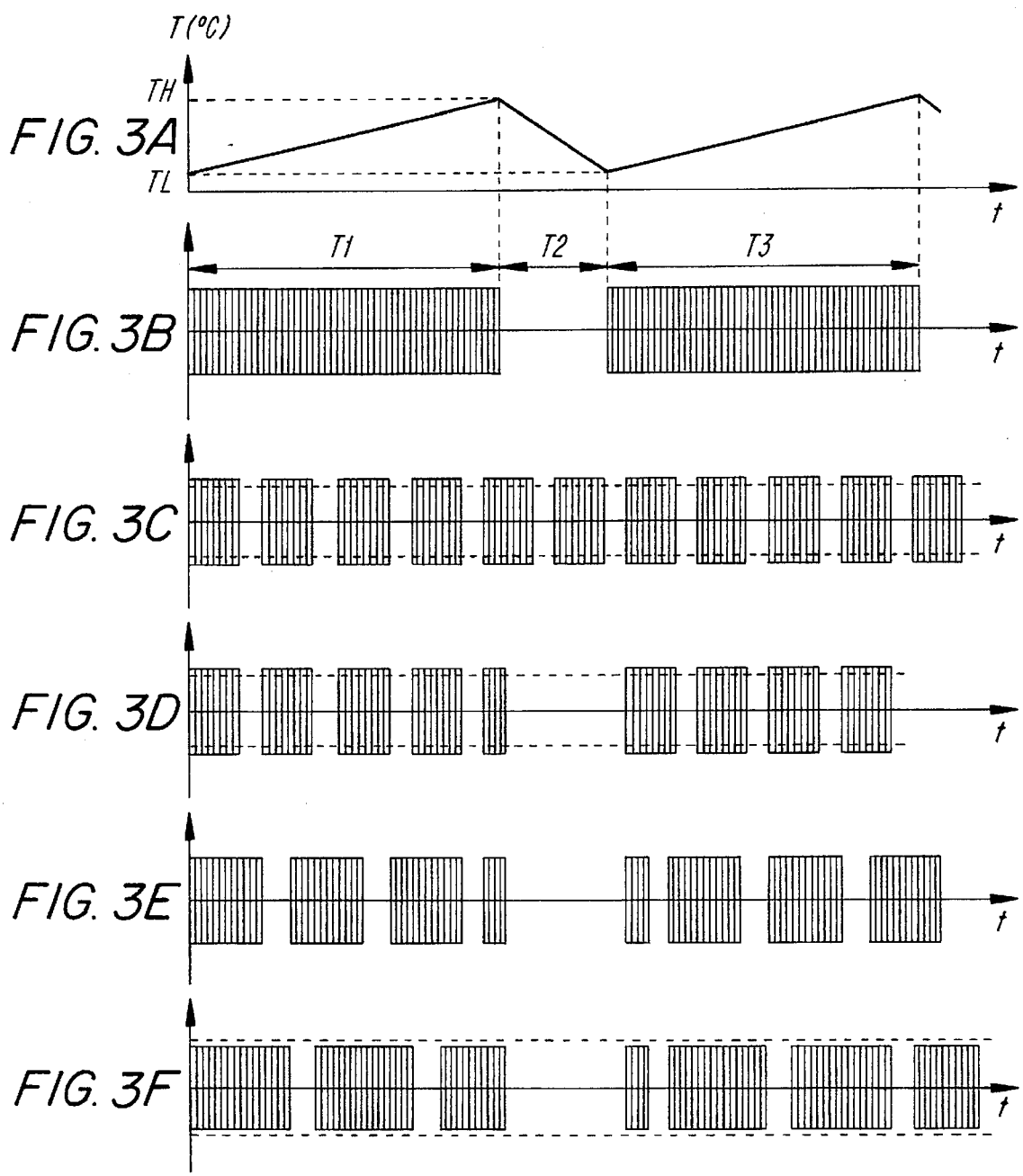

1

CONTROL CIRCUIT FOR AN ELECTRIC COOKER

BACKGROUND OF THE INVENTION (1) Field of the Invention

The present invention relates to a heating control circuit for an electric cooker. More particularly, this invention relates to a heating control circuit for an electric cooker which cooks food according to a power supply voltage, and properly controls electric energy while maintaining a warm temperature.

(2) Description of the Prior Art

A conventional mechanical-type electric cooker having a heating function has a simple internal circuit, but it has many drawbacks concerning its performance. A typical mechanical-type electric cooker driven at AC 110 V/220 V is shown in FIG. 1.

In this mechanical-type electric cooker of FIG. 1, a main heater 1 is connected to an alternating current (hereinafter referred to as an AC) power-supply. The main heater 1 includes a pair of heaters H1 and H2 connected in series and installed at the bottom of a body, and a switch SW1 having 110 V and 220 V terminals. The input terminal of the switch SW1 is connected between fuses F1 and F2 through a varistor V, and is connected between heaters H1 and H2. The other terminal of the switch SW1 is connected to a band heater 2 having heaters H3 and H4 that function as a pair of warming heaters in the body. The output terminal of the heater H4 is connected to a cooking terminal C of the switch SW4 that will be described hereinafter. The band heater 2 includes a switch SW2, and a thermal switch TRS1 similar to a thermistor. A fixed terminal of the switch SW2 is connected to the output terminal of the main heater H2, and a moving terminal thereof is connected between heaters H3 and H4. One terminal of the thermal switch TRS1 is connected to the output terminal of the heater H4, and the other terminal thereof is connected to the AC power-supply.

In addition, a lid heater 3 includes heaters H5 and H6 connected in parallel which are installed in a lid in order to maintain the heating operation. One terminal of a thermal switch TRS2 is connected to the AC power-supply, and the other terminal thereof is connected between heaters H5 and H6. One terminal of a switch SW3 is connected to a heater H5 connected to 110 V or another heater H6 connected to 220 V, and the other terminal thereof is connected to both the cooking terminal C of an external manual switch SW4, and a node between a cooking display lamp L2 and a warming, display lamp L2. The warming and cooking display lamps L1 and L2 are connected to each other in series. One terminal of the lamp L1 is connected to one terminal of the AC power-supply. The cooking display lamp L2 is connected to the other terminal of the AC power-supply through fuses F1 and F2.

When a power-supply of 110 V is applied to the AC power-supply in the above-mentioned electric cooker, the switches SW1 to SW3 are connected to the power-supply terminal of 110 V during the cooking operation, and the switch SW4 is connected to the cooking terminal C. On the other hand, since the thermal switches TRS1 and TRS2 are opened, a power-supply is applied to the heater H1 and the cooking display lamp L1 is turned on. After a predetermined time, the thermal switches TRS1 and TRS2 are closed, and a moving terminal of the switch SW4 is automatically connected to a reheating terminal R, as described below.

A current of the AC power-supply is applied to a heater H1 of the main heater 1, a heater H4 of the band heater 2, and a heater H5 of the lid heater H5. At this time, a heating power of the heater H1 becomes a heating value for the warming control. Especially, to the warm after cooking rice, an internal temperature of the cooker should be maintained around 70° C. because the temperature should be transmitted to both heaters H4 and H5. Simultaneously, the warming display lamp L1 is turned on.

On the other hand, when the AC power-supply receives a voltage of 220 V, the moving terminals of the switches SW1 to SW3 are connected to the 220 V terminal. In this case, when cooking rice, heaters H1 and H2 of the main heater 1 emit heat and a cooking display lamp L2 is turned on. When keeping the contents of the cooker warm, a moving terminal of the switch SW4 is connected to a reheating terminal R, and thermal switches TRS1 and TRS2 are shorted. Therefore, heaters H3 to H5 emit heat for warming mode at the same time the heaters H1 and H2 emit heat for the same. Simultaneously, the warming display lamp L1 is turned on.

Herein, the switch SW4 functions as a magnetic switch made of a permanent magnet and a piece of iron supported by a spring. When cooking rice, a moving terminal made of the piece of iron is connected to the cooking terminal C by pushing the switch SW4 from outside. When the cooker is at a high temperature such as around 135° C., the magnetic force of the magnet is demagnetized, so that the moving terminal of the switch SW4 is connected to the reheating terminal R.

Still another type, not a mechanical-type electric cooker, but an electronic-type electric cooker is described in Japanese Laid-Open Patent Publication No. 90-271809, published on Nov. 6, 1990. In this Japanese patent application, a serial circuit composed of a bidirectional thyristor and a cooking heater is connected so as to receive power from a power source through an attachment plug, and a warming heater is connected in parallel to the bidirectional thyristor. Accordingly, when the bidirectional thyristor is turned off, the rice cooking heater and the warming heater are brought to electric conduction in series, and each of them is heated by a small heating power and a pot is heated by weak heat.

When the bidirectional thyristor is turned on, only the rice cooking heater is brought to electric conduction, heated by a large heating power and the pot is heated by strong heat. In this case, the voltage adjusting device adjusts a heating value by suppressing the inter-terminal voltage of the rice cooking heater. Also, a control circuit is constituted as a microcomputer containing a storage part, a time control part combining a first time counter for executing time counting of a holding time for a timer rice cooking operation, and a second time counter for executing time counting of a continued time for a steaming part, and an arithmetic processing part. Accordingly, the arrangement disclosed in this patent precisely controls the rice cooking operation and the warming operation by using the first and second counter.

However, the above-identified electric cooker cooks food or keeps the warm by using a heater, and controls the heating power by operating the heater according to the temperature of food. Specifically, while controlling the heating power, a first control is achieved by a temperature during a constant period, and a second control is achieved by time after the constant period.

Accordingly, an electric cooker which has a simple circuit, has a low price. On the other hand, in an area in which the power supply voltage is higher or lower than the rated voltage, this electric cooker might cause overheating, or might have a bad effect such as scorched rice or half-boiled rice because of a low heating power. In addition, while using the warming mode in a low-voltage area, not only might the food go bad, but also the food may smell bad. While using the warming mode in a high-voltage area, the food may be burned.

In light of these results, a counterplan to meet requirements in an area in which there is a large variation in AC power supply voltage, is required. For this purpose, electric energy is adjusted at a high level in the low power supply voltage, and is adjusted at a low level in the high power supply voltage. As a result, the cooking and warming temperatures can be constantly maintained irrespective of variation of the AC power supply voltage.

SUMMARY OF THE INVENTION

It is an object of the present invention to provide a control circuit of an electric cooker which adjusts the supply of electric energy by controlling a heater operation according to a variation of a power supply voltage.

It is also another object of the present invention to provide a control circuit of an electric circuit which adjusts the supply of electric energy by controlling an operation of one heater or more according to a variation of a power supply voltage.

In order to achieve these objects and others, the present invention which controls cooking and warming mode operations of an electric cooker having a main heater and an auxiliary heater, includes:

a plurality of voltage sensing means which compare a rated voltage of 110 V or 220 V with an input voltage so as to control the main heater and the auxiliary heater according to a variation of a power supply voltage;

a plurality of temperature controlling means which control a power supply applying time according to a signal from a voltage sensing means;

a time proportion temperature controller which produces a reference voltage of a system by rectifying an AC voltage of an AC power supply means to a direct current (hereinafter referred to as a DC) voltage, receives signals from the temperature controlling means, and outputs a time proportion control signal of a constant period with respect to the signals from the temperature controlling means;

a switching mode temperature controller which has a temperature sensor, senses whether a cooking temperature or a warming temperature is higher or lower than a threshold temperature, and controls a heater operation according to a sensed signal;

a power supply controller which logically processes output signals from both the time proportion temperature controller and the switching mode temperature controller, controls the power supply voltage of the power supply means so as to selectively turn on or off the heaters; and voltage selection supply means which selects the power supply voltage of the power supply means, rectifies the power supply voltage, and then applies it to the voltage sensing means.

By the above-identified arrangement, the voltage selection supply means rectifies the selected voltage according to the power supply of the power supply means, and applies it to the voltage sensing means. The voltage sensing means compares a voltage of the power supply controller with the reference voltage of the time proportion temperature controller, and then applies the result to the temperature controlling means. Since the temperature controlling means has a time control resistor, a time proportion temperature controller generates a time proportion control signal of a constant period, and applies the time proportion control signal to the power supply controller. A switching mode temperature controller has a thermal sensor, generates a heater control signal according to a heater temperature sensed by the thermal sensor, and then applies the heater control signal to the power supply controller. The supply voltage controller logically processes the output signal from the switching mode temperature controller, generates a voltage applying signal to the heater, and thus makes the heater perform cooking or warming operations.

As described above, in order to ensure a heating power based on food temperature, the present invention performs stable cooking and warming operations about a power supply voltage applied to heaters according to a heater driving time and a food temperature, thus improving the quality of food.

BRIEF DESCRIPTION OF THE DRAWINGS

The preferred embodiment of the present invention will now be described more specifically with reference to the attached drawings, wherein:

FIGS. 3A to 3F show waveforms of electric power applied to a band heater according to a voltage variation of FIG. 2.

DETAILED DESCRIPTION OF THE PREFERRED EMBODIMENT

A detailed description of the present invention will now be made referring to the accompanying drawings.

Figure 1:
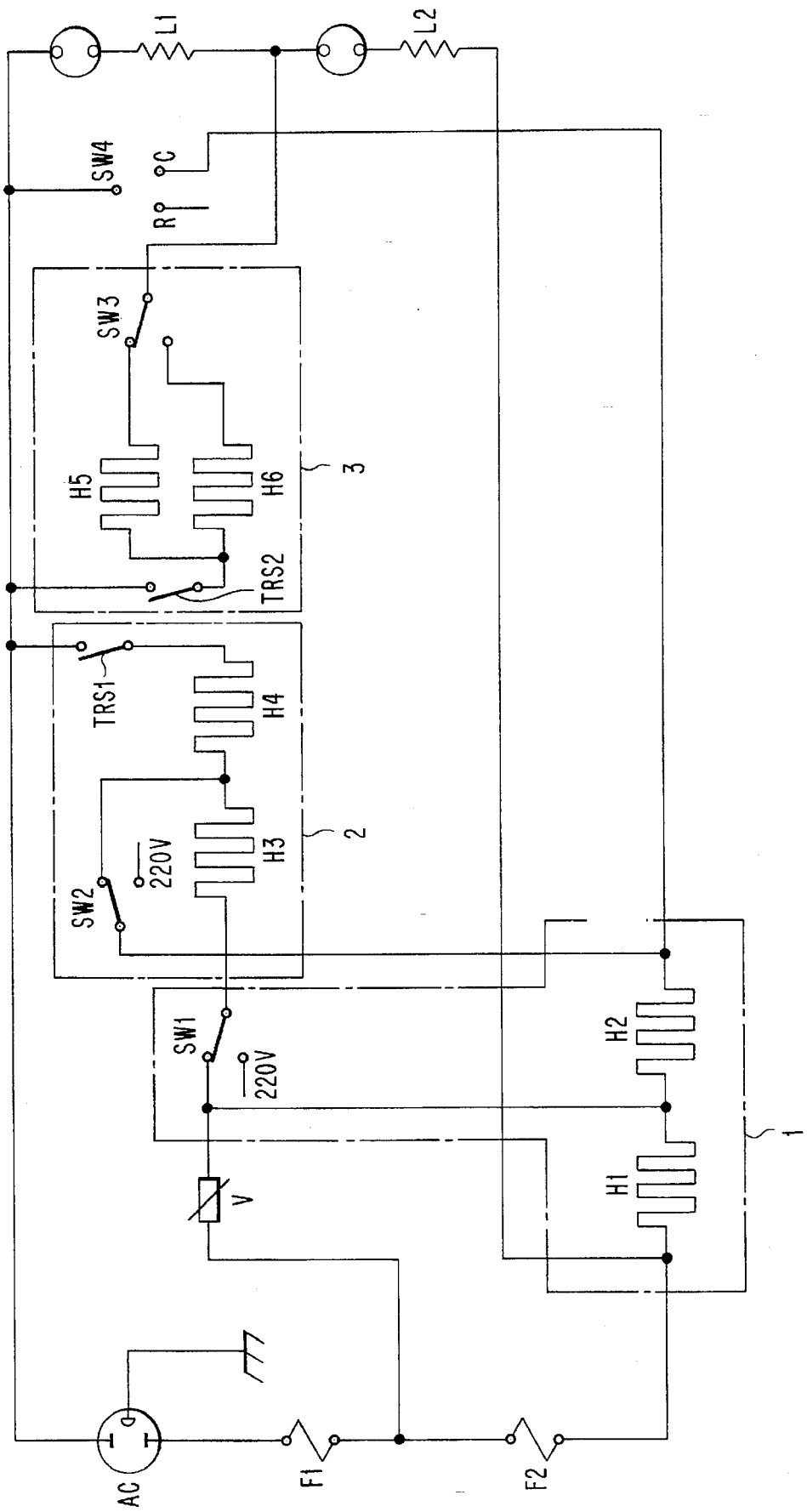
FIG. 1 is a circuit diagram of a conventional mechanical-type electric cooker driven at AC 110 V/220 V.
Figure 2A:
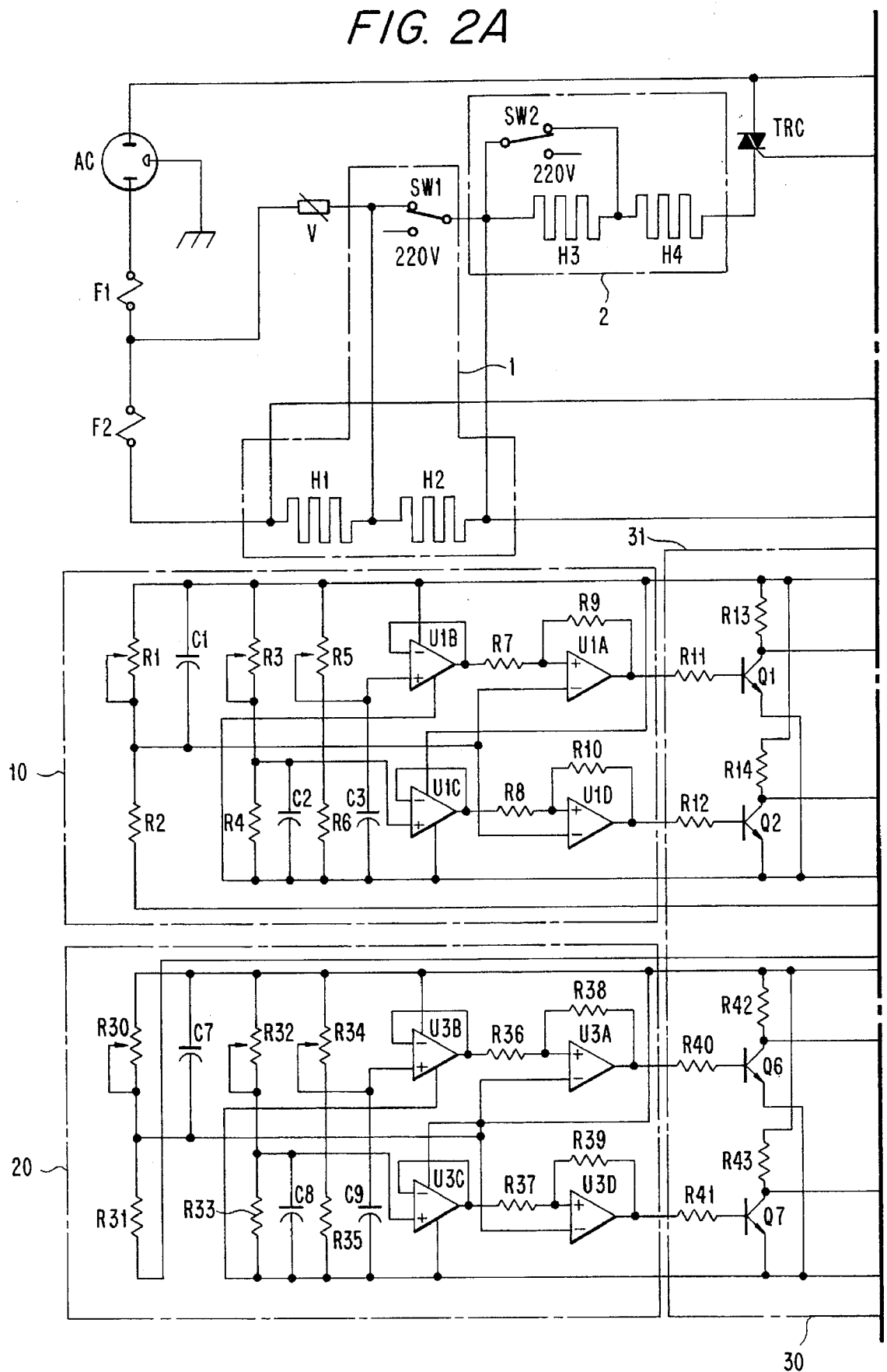
FIG. 2 shows a control circuit of an electronic-type electric cooker driven at AC 110 V/220 V in accordance with the preferred embodiment of the present invention.
Figure 2B:
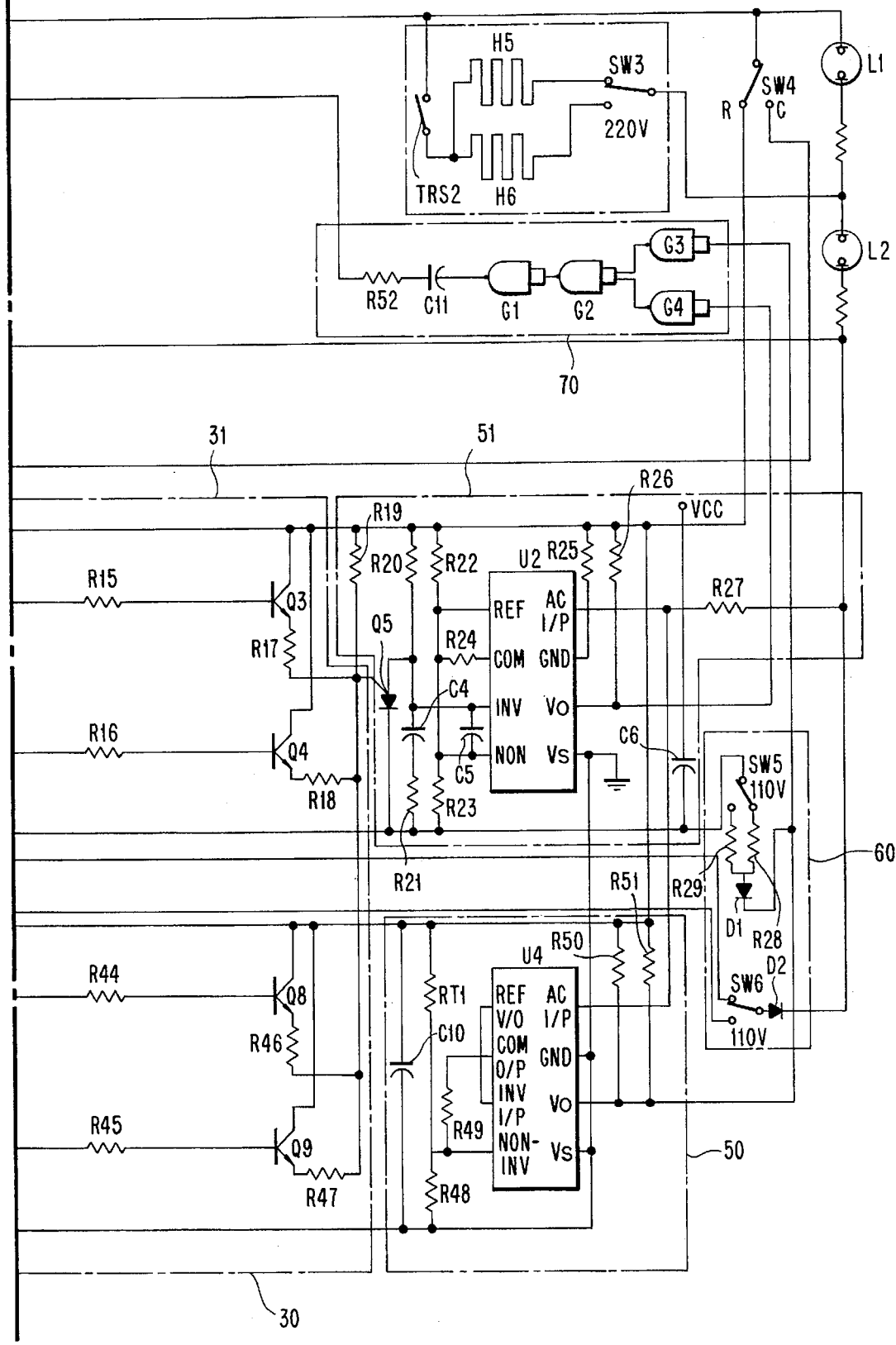

FIG. 2 shows a control circuit of an electric cooker in accordance with the preferred embodiment of the present invention. In FIG. 2, the same parts as FIG. 1 have the same reference numbers shown in FIG. 1, descriptions about them will be omitted below. Although the circuit of FIG. 2 shows a power supply control for a warming function, this circuit can be applicable to the cooking function as discussed in the following description.

Referring to FIGS. 2 through 3F, in a band heater 2 a triac TRC which functions as an alternating power control element on behalf of a thermal switch TRS1, is connected between power supply means AC and heater H4. The triac TRC includes a power supply controller 70 as described in the following description.

The control circuit according to the present invention has a voltage selection supply means 60 for selecting an AC voltage. The voltage selection supply means 60 includes two switches SW5 and SW6 having selection terminals for 110 V and 220 V. The switch SW6 is connected to a diode D2. A half-wave rectified power supply through the diode D2 is applied to a voltage sensing means 10 and 20. Here, the switch SW5 is grounded, a terminal 110 V or 220 V of the switch SW5 is connected to a resistor R28 or R29 connected to a diode D1.

The power supply of the power supply means is applied to a time proportion temperature controller 51 and a switching mode temperature controller 50. The time proportion temperature controller 51 includes a zero-cross switching means U2 in the form, for example, of an integrated circuit. The zero-cross switching means U2 includes a rectifier circuit, receives 110 V being AC voltage of an AC power supply means through an input terminal AC, outputs a DC stabilized current being a DC reference voltage rectified by DC voltage to a reference terminal REF, and applies the DC stabilized current to the voltage sensing means 10 and 20 through a resistor R19.

A non-inverting terminal of the zero-cross switching means U2 applies a reference voltage divided by resistors R22 and R23. A common terminal COM is connected between resistors R22 and R23 by a resistor R24. Herein, the resistor R22 can be replaced by a thermal sensor, installed in the vicinity of the cooking heater, and thus controls the heater operation. The inverting input terminal INV is connected between a resistor R20 and a condenser C4, and is connected to an anode of a programmable uni-junction transistor (hereinafter referred to as a PUT) Q5. A gate of the PUT Q5 is connected to a power supply Vcc through a resistor R19, and a cathode thereof is grounded. The thyristor Q5 functions as the PUT Q5 determines an ON-timing according to a voltage applied to both sides of the resistor R19.

The switching mode temperature controller 50 includes a zero-cross switching means U4. An inverting terminal INV of the switching mode temperature controller 50 applies a voltage signal divided by both a resistor R49 and a thermal switch such as a thermistor. The voltage signal is applied to a common terminal COM through a resistor R49. An output terminal Vo outputs an ON/OFF control signal of the band heater 2. The above-identified zero-cross switching means are KA28804 manufactured by Samsung Electronics Co., Ltd.

The voltage sensing means 10 and 20 are equal to each other. When applying 110 V, a half-wave rectified voltage through the diode D2 of the voltage selection supply means 60 is applied to the voltage sensing means 10. This voltage is divided by a variable resistor R1 and a resistor R2, and is then applied to inverting terminals of comparators U1A and U1D. Herein, the comparators U1A and U1D stabilize the output signals by having feedback resistors R9 and R10.

A DC stabilized voltage output from the zero-cross switching means U2 of the time proportion temperature controller 51 is applied to a buffer U1C through the resistor R19 as a reference voltage divided by a variable resistor R3 and a resistor R4. A signal via the buffer U1C is applied to a comparator U1D through a resistor R8, thus the comparator U1D outputs a constant control signal.

In case of a rated voltage 110 V, the reference voltage divided by a variable resistor R5 and a resistor R6 is input to a non-inverting terminal of the buffer U1B. A signal via the buffer U1B is applied to a non-inverting terminal of the comparator U1A through a resistor R7, thus the comparator U1A outputs a constant control signal. Herein, an electrolytic condenser C1 erases an alternating component, and condensers C2 and C3 are grounded.

Likewise, in voltage sensing means 20 for sensing a voltage of 220 V, a reference voltage divided by a variable resistor R30 and a resistor R31 is applied to non-inverting terminals of comparators U3A and U3D. Herein, the comparators U3D and U3A attain stabilized output signals by having feedback resistors R38 and R39. A DC stabilized voltage from the time proportion temperature controller 51 is divided by a variable resistor R32 and a resistor R33, after passing through a resistor R19, and the divided reference voltage is input to a buffer U3C. The buffer U3C applies a predetermined signal to the comparator U3D through a resistor R37. Simultaneously, the DC stabilized voltage from the time proportion temperature controller 51 is divided by a variable resistor R34 and a resistor R35, and the divided reference voltage is input to a buffer U3B. The buffer U3B applies a predetermined signal to the comparator U3A through a resistor R36. Herein, an electrolytic condenser C7 erases an alternating component, condensers C8 and C9 are grounded.

Temperature controllers 30 and 31 are equal to each other. The temperature controller 31 includes two pairs of transistors, i.e., transistors Q1 and Q3 and transistors Q2 and Q4 connected in series. The transistors Q1 and Q2 include base resistors R11 and R12 and collector resistors R13 and R14, respectively. The transistors Q3 and Q4 include base resistors R15 and R16 and emitter resistors R17 and R18. The resistors R17 and R18 are individually arranged with the resistor R19 of the time proportion temperature controller 51, or are connected in parallel with the resistor R19. In addition, the resistors R17 and R18 are connected to a gate of PUT Q5.

Similarly, the temperature controller 30 includes two pairs of transistors, i.e., transistors Q6 and Q8 and transistors Q7 and Q9 connected in series. The transistors Q6 and Q7 include base resistors R40 and R41 and collector resistors R42 and R43. The transistors Q8 and Q9 include base resistors R44 and R45 and emitter resistors R46 and R47. The emitter resistors R46 and R47 are individually arranged with the resistor R19, or are connected in parallel with the resistor R19. In addition, the resistors R46 and R47 are connected to the gate of PUT Q5.

A power supply controller 70 includes four NAND gates coupled with a negative logic. The NAND gate G3 receives a signal from the switching mode temperature controller 50. The NAND gate G4 receives a signal from the time proportion temperature controller 51. The NAND gates G3 and G4 are simultaneously input to a NAND gate G2. The output of the NAND gate G2 is inputted to a NAND gate G1. An output signal of the NAND gate G1 is applied to a gate of the triac TRC through a resistor R52 and a condenser C11. Therefore, the lid heater 2 is controlled by ON/OFF operations of the triac TRC.

In the mean time, in the time proportion controller 51, a precise thermal switch on behalf of a resistor R22 is mounted, and an additional voltage selection supply means identical with the power supply controller 70 is also mounted, and the triac TRC is mounted at the rear of the heater H2. According to the cooking temperature detected by the thermal sensor, the time proportion controller 51 turns on or off the triac TRC, thereby controlling the main heater 1.

As described above, the present invention, when applying the power supply of 110 V, the switches SW1 to SW6 are connected to a terminal of 110 V. Accordingly, the power supply of 110 V operates the heater H2 of the main heater 1, thereby starting the cooking operation. Simultaneously, the power supply is applied to the voltage selection supply means 60, a diode D2 performs a half-wave rectifying about the power supply, and then the power supply is provided for the control circuit.

After the rice cooking is finished, the heater H2 of the main heater 1 and the heater H5 of the band heater H4 perform a warming operation. During the warming operation, the heater H5 turns on or off according to temperature sensed by a thermal switch TRS2, and the heater H4 is controlled by the power supply controller 70. That is, in the switching mode temperature controller 50, a thermal sensor RT1 such as a thermistor senses the temperature of the band heater 2. According to the temperature sensed by the thermistor, a zero-cross switching means U4 outputs a driving control signal for the switching mode temperature controller 50. That is, when the warming temperature repeatedly rises and falls as shown in FIG. 3A, the resistance value of the thermistor RT1 is lower than the resistance value of the resistor R48 in periods T1 and T3 from a lower limit temperature $T_L$ to an upper limit temperature $T_H$. Accordingly, a non-inverting terminal NON of the zero-cross switching means U4 receives a withstand voltage and a high level signal, and then receives a high level singal to the NAND gate G3 of the power supply means 70. This signal drives the triac TRC by logically processing through NAND gates G3, G2 and G1, so that the power supply is applied to the heater H4 of the band heater 2 as shown in FIG. 3B.

On the other hand, when the temperature falls from the upper limit temperature $T_H$ to the lower limit temperature $T_L$, the thermal sensor RT1 has a high resistance value, the zero-cross switching means U4 receives a low level signal due to a voltage divided by the thermal sensor RT1 and the resistor R48, so that the zero-cross switching means U4 outputs a low level signal. Since this low level signal is applied to the power supply controller 70, the triac TRC is turned off and the warming heater H4 is turned off. However, in this case, when the power supply voltage is low or high, the rising and falling characteristics of the temperature are different from the rated voltage, thus a satisfactory warming effect is not attained. According to the principle of the present invention, the switching mode temperature controller 50 along with a time proportion control signal having a constant period from the time proportion temperature controller 51 controls the warming heater.

Accordingly, the time proportion temperature controller 51 receives a power supply voltage through a zero-cross switching means U2, precisely rectifies the power supply voltage, and then the power supply voltage to the voltage sensing means 10 and 20 through a resistor R19. The voltage sensing means 10 divides the voltage rectified by a diode D2 of the voltage selection supply means 60 by using the variable resistor R1 and the resistor R2. This reference voltage is simultaneously applied to the inverting terminals of the comparators U1A and U1D.

By way of example, when the power supply higher than 120 V is applied in an overvoltage area, a stabilized voltage through the resistor R19 is divided by a variable resistor R3 and a resistor R4. This reference voltage is applied to the non-inverting terminal of the comparator U1D. The comparator U1D compares a reference signal of the non-inverting terminal thereof with an input signal of an inverting terminal thereof, and judges whether overvoltage occurs. At this time, when a reference voltage input to the non-inverting terminal is lower than the voltage input to the inverting terminal, the overvoltage state is decided by the comparator U1D and then the comparator U1D outputs a high level signal. On the other hand, when the reference voltage input to the non-inverting terminal is lower than the voltage input to the inverting terminal, the low-voltage state is decided by the comparator U1D and then the comparator U1D outputs a high level signal. As a result, transistors Q2 and Q4 are sequentially triggered in the temperature controller circuit 31.

Since the PUT Q5 of the time proportion temperature controller 51 is also triggered at the same time, the resistor R19 is connected to a resistor R17 in parallel. At this time, resistance values of these resistors are to be lower than those of resistors R20 and R21. Therefore, a low level signal is applied to an inverting terminal INV of a zero-cross switching means U2, a non-inverting terminal NON thereof receives a voltage divided by resistors R22 and R23, i.e., a high level signal of withstand voltage. As a result, the time proportion temperature controller 51 outputs the time proportion control signal having a constant period, as shown in FIG. 3C. The time proportion control signal is applied to the power supply controller 70 along with the output signal of the switching mode temperature controller 50, thereby operating the triac TRC as shown in FIG. 3D. Accordingly, the intermittent power supply is applied to the auxiliary heater H4, and controls the overall electric energy to be lowered.

On the contrary, no overvoltage state or the rated voltage state is decided by the comparator U1D in applying the low voltage, the comparator U1D outputs a low level signal and the transistors Q2, Q4 and PUT Q5 are turned off. Accordingly, the resistor R19 is in parallel connected to the resistors R17 and R18, so that the maximum resistance occurs. At this time, a voltage divided by the resistors R20 and R21 is applied to the inverting terminal INV. Simultaneously, a voltage divided by the resistors R22 and R23 is applied to a non-inverting terminal of the zero-cross switching means U2.

At this time, as shown in FIG. 3E, the zero-cross switching means U2 outputs a time proportion control signal having a constant period, and controls the triac TRC of the power supply controller 70 with the signal from the switching mode temperature controller 50. As a result, the electric energy applied to the heater H4 is constantly controlled.

Meanwhile, if the applied voltage is around the rated voltage in a low-voltage area, a reference voltage divided by the variable resistor R5 and the resistor R6 is input to a buffer U1B. This reference voltage is input to the non-inverting terminal of the comparator U1A. The comparator U1A compares this reference voltage with a voltage applied to its inverting terminal via the voltage selection supply means 60. If the reference voltage is higher than the voltage of the inverting terminal, an input state of low voltage is determined by the comparator U1A, so the comparator U1A outputs a low level signal. If the reference voltage is lower than the voltage of the inverting terminal, an overvoltage input state of the rated voltage state is determined by the comparator U1A, so the comparator U1A outputs a high level signal.

That is, when the comparator U1A outputs a low level, the transistors Q1 and Q3 and PUT Q5 are turned off. Accordingly, the resistor R19 is connected in parallel to the resistors R17 and R18, so that maximum resistance occurs. At this time, a voltage divided by the resistors R20 and R21 is applied to the inverting terminal INV. Simultaneously, a voltage divided by the resistors R22 and R23 is applied to the non-inverting terminal of the zero-cross switching means U2, the zero-cross switching means U2 generates a synchronizing signal having a constant period as shown in FIG. 3F.

The synchronizing signal is applied to the power supply controller 70 along with a control signal from the switching mode temperature controller 50, and operates the triac TRC according to a logical processing, thereby increasing the electric energy applied to the heater H4.

In addition, if the buffer U1B outputs a high level signal when applying the rated voltage and the comparator U1A becomes a high level, transistors Q1 and Q3 and PUT Q5 are turned on, a low level signal is input to the inverting terminal of the zero-cross switching means U2. Simultaneously, the non-inverting terminal NON receives a high level signal of a voltage divided by the resistors R22 and R23. At this time, in case of applying the rated voltage, the zero-cross switching means U2 generates a signal shown in FIG. 3E, and induces the warming heater H4 to do a normal operation. In case of applying overvoltage, this signal shown in FIG. 3E is coupled with a signal from the switching mode temperature controller 50 as a logic circuit, thereby controlling the triac TRC according to waveforms shown in FIG. 3D.

The time proportion temperature controller 51 and the switching mode temperature controller 50 employ the same integrated circuits called zero-cross switching means, that might perform the same function. However, the zero-cross switching means U4 of the switching mode temperature controller 50 repeatedly performs the ON/OFF operations according to rising and falling temperatures sensed by thermal sensor RT1. On the other hand, the zero-switching means U2 of the time proportion temperature controller 51 controls a parallel connection between the resistors R17 and R18 about the resistor R19, according the inputs of overvoltage, the rated voltage and a low voltage. The inverting terminal of the zero-cross switching means U2 receives a low level signal or a time proportion control signal such as a divided reference voltage, so that the time proportion control signal having a constant period is generated.

Similarly, in case of applying the power supply of 220 V, the voltage sensing means 20 and the temperature controller 30 are equally operated with another voltage sensing means 10 and the temperature controller 31, thereby providing the same output signals to the time proportion temperature controller 51. Accordingly, the warming heater H4 of the band heater 2 is controlled, and electric energy to be provided is increased.

Although the above preferred embodiment describes an electric cooker capable of doing 110 V/220 V switching, it can be applicable to an electric cooker only using 110 V or an electric cooker only using 220 V.

Accordingly, the present invention controls the ON/OFF operations of warming heaters by using the switching mode temperature controller 50, and properly controls electric energy applied to the heaters by a control signal having a constant period from the time proportion temperature controller 51.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art which this invention pertains.

What is claimed is:

1. A control circuit for an electric cooker having a main heater and a warming heater, comprising:

a plurality of voltage sensing means each of which compares a system rated voltage with an input voltage, and judge whether said input voltage is above a rated voltage, rated voltage, or below a rated voltage;

a plurality of temperature controlling means which control a power supply application time according to a control signal from a respective voltage sensing means of said plurality of voltage sensing means;

a time proportion temperature controller which generates a reference voltage by rectifying an external AC power supply to a DC voltage, and generates a time proportion control signal having a constant period, said time proportion control signal being generated according to a signal from said temperature controlling means;

a switching mode temperature controller which has a temperature sensor, and senses whether at least one of a cooking temperature or a warming temperature is higher or lower than a threshold temperature, and controls operation of a heater according to a sensed signal generated by the temperature sensor;

a power supply controller which controls said heater operation by logically processing output signals from both said time proportion temperature controller and said switching mode temperature controller, and controls a heating power by controlling a power supply voltage of a power supply means; and voltage selection supply means which selects said power supply voltage of said power supply means, rectifies said power supply voltage, and then applies said power supply voltage to said voltage sensing means.

2. The control circuit for an electric cooker according to claim 1, wherein said voltage sensing means senses said overvoltage, said rated voltage, or said low voltage.

3. The control circuit for an electric cooker according to claim 1, wherein each of plurality of said temperature controlling means includes a plurality of temperature controlling resistors which are individually connected either in series with another power applying resistor, or connected in parallel with the same, according to ON/OFF operations of a programmable uni-junction transistor (PUT) within said time proportion temperature controller.

4. The control circuit for an electric cooker according to claim 1, wherein said time proportion temperature controller includes a system power supply resistor and a programmable uni-junction transistor (PUT), said programmable uni-junction transistor (PUT) being turned on or off according to a signal from said temperature controlling means, thereby selectively connecting said system power supply resistor to said temperature controlling resistors in parallel, thereby generating said time proportion control signal.

5. The control circuit for art electric cooker according to claim 1, wherein said time proportion temperature controller includes a temperature sensor mounted proximally to said main heater and a switching element mounted in a rear part of said main heater, a voltage division resistor connected to a non-inverting terminal of said time proportion temperature controller and delivering a divided voltage thereto so as to generate said time proportion control signal, thereby controlling ON/OFF operation of said main heater in an overvoltage condition.

6. The control circuit for an electric cooker according to claim 4, wherein said time proportion temperature controller includes a temperature sensor mounted proximally to said main heater and a switching element mounted in a rear part of said main heater, a voltage division resistor connected to a non-inverting terminal of said time proportion temperature controller and delivering a divided voltage thereto so as to generate said time proportion control signal, thereby controlling ON/OFF operation of said main heater in an overvoltage condition.

7. A heating apparatus in a cooking appliance, the apparatus comprising:

a first heater and a second heater;

a voltage selection supply means that receives an AC input voltage, senses a level of the AC input voltage, and directs an output of the AC input voltage in accordance with the sensed level of the AC input voltage;

a time proportion temperature controller that receives the AC input voltage and rectifies it to generate reference voltage, the time proportion temperature controller further generating a time proportion control signal;

a voltage sensing means that receives both the directed AC input voltage from the voltage selection supply means and the reference voltage, compares the directed AC input voltage and the reference voltage and outputs a time constant control signal based on the comparison;

a temperature control means that receives the time constant control signal and determines a power application time signal according to the time constant control signal, which power application time signal is supplied to the time proportion temperature controller for generation of the time proportion control signal;

a switching mode temperature controller having a temperature sensor, which switching mode temperature controller controls the first heater according to a temperature sensor signal; and a power supply controller having logic, which logic receives the temperature sensor signal and said time proportion control signal to control application of power to said second heater.

8. A method of controlling a heater, the method comprising the steps of:

receiving a commercial AC voltage;

rectifying the commercial AC voltage to produce a reference voltage;

sensing a level of the commercial AC voltage and routing the commercial AC voltage to one of a first or a second voltage sensing means based on the sensed level;

comparing the reference voltage to the routed commercial AC voltage to produce a time constant control signal;

generating a time proportion control signal based on the time constant control signal;

sensing a temperature of the heater and generating a temperature sensor control signal therefrom; and applying the temperature sensor control signal and the time proportion control signal to a logic circuit to control application of power to the heater.

9. The method of controlling a heater claimed in claim 8, wherein the heater is controlled pursuant to the temperature sensor control signal when the commercial AC voltage sensed is substantially equal to a rated voltage for the heater.

10. The method of controlling a heater claimed in claim 8, wherein the heater is controlled pursuant to both the time proportion control signal and the temperature sensor control signal when the commercial AC voltage sensed is not substantially equal to a rated voltage for the heater.

11. A method for controlling a heater, the method comprising the steps of:

sensing a level of a commercial power supply;

sensing a temperature of the heater;

controlling the heater in accordance with sensed temperature of the heater if the commercial power supply is stable at a level conforming to a rated voltage level for the heater; and controlling the heater in accordance with a combination of a time constant control signal derived from the sensed level of the commercial power supply, and the sensed temperature of the heater, if the commercial power supply is not stable at a level conforming to a rated voltage level for the heater.

* * * * *